(12) United States Patent
Gentile (10) Patent No.: US 12,184,144 B2
(45) Date of Patent: Dec. 31, 2024

(54) ELECTRIC DEVICES, GENERATORS, AND MOTORS

(71) Applicant: Francis X Gentile, Los Angeles, CA (US)

(72) Inventor: Francis X Gentile, Los Angeles, CA (US)

(73) Assignee: Francis Gentile, Los Angeles, CA (US)

( * ) Notice: Subject to any disclaimer, the term of this patent is extended or adjusted under 35 U.S.C. 154(b) by 0 days.

(21) Appl. No.: 17/521,667

(22) Filed: Nov. 8, 2021

(65) Prior Publication Data

US 2022/0069660 A1  Mar. 3, 2022

Related U.S. Application Data (63) Continuation of application No. 15/410,630, filed on Jan. 19, 2017, now Pat. No. 11,171,533, which is a continuation-in-part of application No. 14/479,313, filed on Sep. 6, 2014, now Pat. No. 9,583,989.

(60) Provisional application No. 61/874,370, filed on Sep. 6, 2013.

(51) Int. Cl.
| | |
|---|---|
| H02K 5/04 | (2006.01) |
| H02K 1/22 | (2006.01) |
| H02K 3/47 | (2006.01) |
| H02K 5/00 | (2006.01) |
| H02K 5/15 | (2006.01) |
| H02K 21/12 | (2006.01) |
| H02K 5/24 | (2006.01) |
| H02K 7/18 | (2006.01) |
| H02K 15/03 | (2006.01) |

(52) U.S. Cl.
CPC ............... *H02K 5/04* (2013.01); *H02K 5/00* (2013.01); *H02K 5/15* (2013.01); *H02K 5/24* (2013.01); *H02K 7/1853* (2013.01); *H02K 7/1861* (2013.01); *H02K 15/03* (2013.01)

(58) Field of Classification Search
CPC .............. H02K 5/00; H02K 5/04; H02K 1/12; H02K 1/14; H02K 1/06; H02K 5/14; H02K 5/15; H02K 5/24; H02K 21/24
USPC ..... 310/89, 152, 156, 67 A, 402, 410, 254.1; 220/4.28
See application file for complete search history.

(56) References Cited

U.S. PATENT DOCUMENTS 3,452,229 A    6/1969    Pimlot
3,591,212 A * 7/1971    Rhyne ............... B27M 1/02
                                                            403/231

(Continued)

FOREIGN PATENT DOCUMENTS

GB          2006542 A * 5/1979 ............. C07H 7/027

*Primary Examiner* — Burton S Mullins
(74) *Attorney, Agent, or Firm* — Fish IP Law, LLP (57) ABSTRACT

Simple to manufacture electric generators or motors and methods of manufacturing such are disclosed. Such devices are preferably manufactured from 2-dimensionally cut, flat stock materiel. The generator or motor has two large diameter rotors to enable, for example, useful generation of electricity at low revolutions per minute. The frame of the generator includes stators sidewalls with castellations on the periphery of the walls. Castellated end plates removably interlock with the stators. The rotors drive magnets past the stators in the frame of the device. In preferred embodiments, rotors are driven by human legs or arms, low speed wind, or water with low or zero water drop distance.

12 Claims, 12 Drawing Sheets

(56) References Cited

U.S. PATENT DOCUMENTS

| | | | |
|---|---|---|---|
| 3,692,201 A * | 9/1972 | Garduna | B65D 9/34 |
| | | | 217/65 |
| 4,173,287 A * | 11/1979 | Kumakawa | B65D 9/12 |
| | | | 403/231 |
| 4,211,945 A * | 7/1980 | Tawse | H02K 19/16 |
| | | | 310/1 |
| 4,276,490 A | 6/1981 | Saldinger | |
| 5,357,728 A * | 10/1994 | Duncanson | B29C 66/4326 |
| | | | 52/592.4 |
| 5,844,341 A * | 12/1998 | Spooner | H02K 16/00 |
| | | | 310/410 |
| 6,124,702 A | 9/2000 | Pinkerton et al. | |
| 6,727,668 B1 | 4/2004 | Maslov | |
| 6,777,851 B2 | 8/2004 | Maslov | |
| 6,787,951 B2 | 9/2004 | Pyntikov et al. | |
| 6,927,524 B2 | 9/2005 | Pyntikov et al. | |
| 6,949,864 B2 | 9/2005 | Maslov et al. | |
| 7,816,830 B2 | 10/2010 | Dickes | |
| 7,839,049 B2 | 11/2010 | Jansen | |
| 8,688,345 B2 | 4/2014 | Boughtwood | |
| 8,688,346 B2 | 4/2014 | Boughtwood | |
| 11,171,533 B2 * | 11/2021 | Gentile | H02K 5/04 |
| 2003/0205946 A1 | 11/2003 | Maslov | |
| 2004/0021437 A1 | 2/2004 | Maslov et al. | |
| 2004/0145323 A1 | 7/2004 | Maslov et al. | |
| 2005/0184689 A1 | 8/2005 | Maslov et al. | |
| 2008/0211322 A1 * | 9/2008 | Heinrich | H02K 3/28 |
| | | | 310/195 |
| 2009/0140526 A1 | 6/2009 | Jansen | |
| 2013/0062889 A1 | 3/2013 | Thoresen | |

* cited by examiner

ELECTRIC DEVICES, GENERATORS, AND MOTORS

CROSS REFERENCE TO RELATED APPLICATIONS

This application is a continuation of U.S. Ser. No. 15/410,630 filed 1 Jan. 2017, which is a CIP continuation in part of U.S. Ser. No. 14/479,313 6 Sep. 2014. This application claims the benefit of PPA Ser. No. 61/874,370 filed 6 Sep. 2013 by the present Inventor, which is incorporated by reference.

Disclosed as related applications and integrated into this disclosure by specific reference to previous applications by the same inventor are: PPA Ser. No. 61/874,370 filed 6 Sep. 2013

SUMMARY OF THE INVENTION

A simple to manufacture electric generator or motor is contemplated. The generator is designed to be built of 2-dimensionally cut flat stock materials. The generator has larger diameter than conventional electric generators. The generator is designed to operate at lower revolutions per minute than conventional generators, so as to be driven by human legs or arms, wind generation at low wind speeds, water movement at low or zero water drop distance or 'head,' or other applications.

DRAWINGS

Reference Numerals

1 Shaft, axle;
2 Rotor tooth connect, rotor axle torsion pinned spacer or peripheral rotor spacer interlock pieces;
3 Rotor;
4 Spacer;
5 Ball-bearing, or other bearing;
6 Stator sidewall;
7 box closure piece;
8 Interior stator reinforcement and bearing seat;
9 Interior stator reinforcement and bearing seat;
10 Bolt;
11 Nut;
12 Washer;
13 Pedal;
14 Magnet;
15 Wire zig zagged around the circumference;
16 Externally accessible slot for wire;
17 Slot of interlocking castellations;
18 Peripheral rotor spacer interlock pieces;
19 Pin;
20 Magnetic box closure piece;
21 Unbent cutout magnet pole face and riser;
22 Magnetic pole face;
23 Magnetic pole riser;
24 Bending slots;
25 Protrusion to locate slot in cover;
26 Slot in cover;
27 Locating nib;
28 Number cut to show size and position assembly;
29 Circumferential interlock protrusion;
30 Overhanging outside entrapment; and
31 Under rotor magnetically conductive pieces.

DETAILED DESCRIPTION

The invention comprises an electric generator or motor with larger than conventional diameter, designed to operate at lower revolutions per minute than conventional generators. Such devices are driven by human legs or arms, wind generation at low wind speeds, water movement at low or zero water drop distance or 'head,' or other applications. Low rpm generators or motors are designed to be constructed by 2-dimensional cutting of flat stock materials.

Ideally the invention is capable of generating electricity without batteries in the system. It should generate power in the lowest wind speeds. Rapid design variation and field modification should be inherent. Low audio and RF noise is desirable. Therefore it is desirable to avoid slip rings, which can cause sparks, explosions, and radio interference. Slip rings are susceptible to corrosion, therefore susceptible to failure, and require maintenance. The generator/alternator achieved will be quieter, and therefore less disruptive to the people working in proximity. A reduction gear or drive will not be required, providing reduced noise and efficiency losses compared to gearboxes and chains etc.

The generators rotor must have the largest possible diameter to achieve usable voltages in the smallest of winds, low human pedaling speed, or low head water wheel speeds. Physical repatching of coils is an efficient electronic control method to effectively extract energy from wind and other small variable generation sources. Physical repatching avoids voltage drops across semiconductors and parasitic power drains in switching circuits.

Such a low rpm generator will be able to take advantage of lower winds because it can use the dense turbine blade disks associated with water pumping wind generators. The low tips speeds of the wind turbines make the wind turbine quieter.

The ability to generate usable power in the lowest winds is a different definition of efficiency, in the sense of having power when you need it, without relying on heavy and expensive batteries to store energy between hoped for high wind episodes required by other generators.

To generate large wattages from a human for long periods of time, large amounts of cooling are necessary, most practically by wind. The addition of a large fan for cooling the rider will increase total work output by perhaps 20 fold per session.

Humans emit perhaps 80% waste heat similarly to a passenger car, so humans overheat if you run them hard standing still as a passenger car does. Probably all exercise machines should have large user controlled fans.

Possibly the same fan that is used for the wind generation could be applied as a cooling blower during doldrums where human generation may be required.

In summary a low rpm generator has many applications, such as low speed wind of the historical water pumping turbine style and historical grain grinding "sail" style, human and animal power, low head water power such as surface flow using a floating paddle wheel concept and wave powered buoys.

The generator's edge shape is made up of flat or planar sections (see element 7) of sufficient quantity to have some circularity. That is to say as a polygon of equal sides whose junctions fall on the same circle, a regular convex equiangular polygon. This design facilitates access to open slots for winding placement. The zig zag winding of single strands circulating around the periphery with an air core magnetic circuit is the primary design described here, as this is lightweight, the magnets are permanent and the total expected power is low.

Other configurations are possible such as prewound coils that span two opposed slot sets as 4 winding slots in total could allow a more conventional salient or lapped pole generator/motor winding to be accessed from the exterior.

Figure 13:
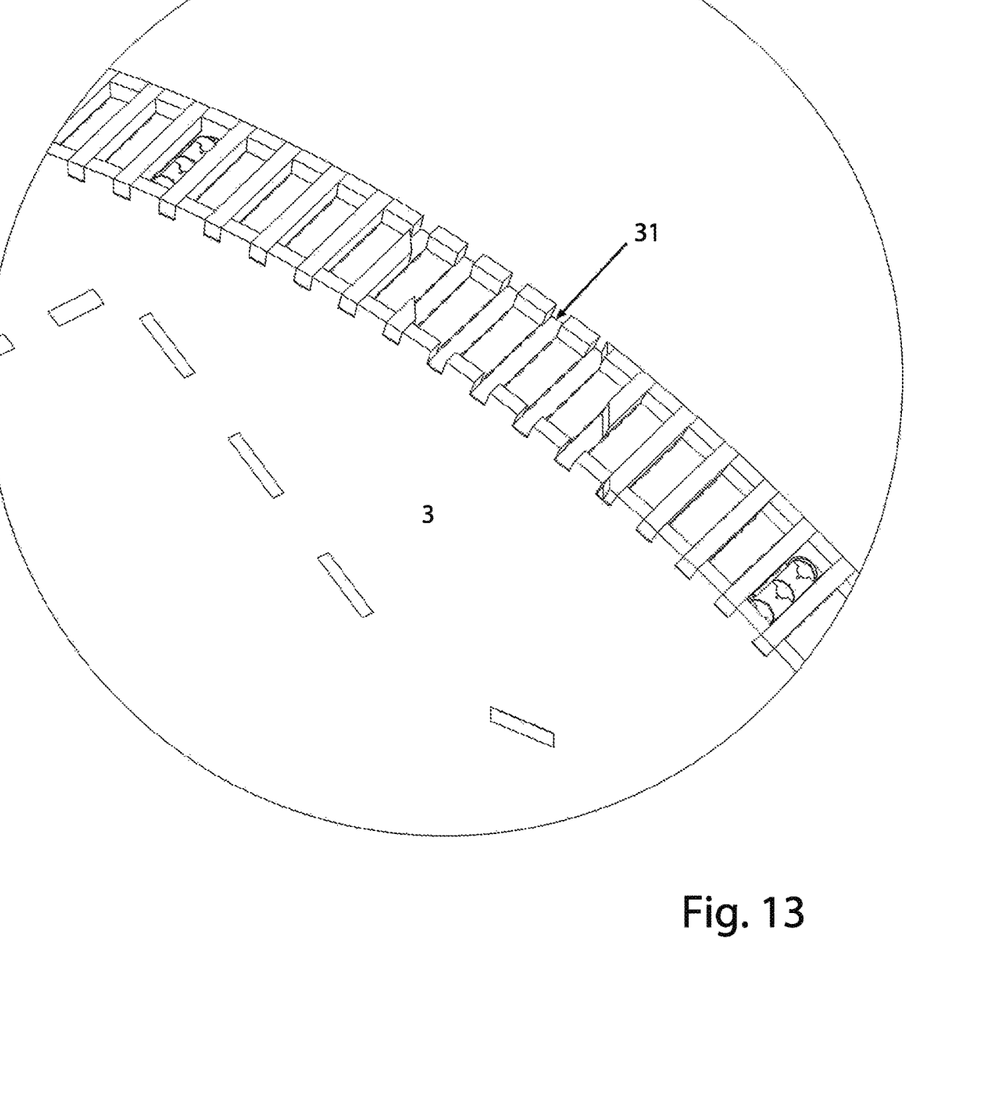
FIG. 13. A view of rotors and magnets with installed under rotor magnet pieces.

Alternate configurations of more conventional circular windings could be built around two of these deeper cuts for single phase poles or across many cuts for multiphase winding schemes, wherein it is probable that magnetically conductive core materiel would be preferred to form the stator, layers of which could be stacked between the side panels in lieu or in addition to the generator box closure of FIG. 13 etc, which is presently not shown in these drawings which focus on non magnetic structural materials and air cored windings.

The box closure pieces (see element 7) could be made of magnetically conductive materials which could have protrusions through the center of the coils to form poles of magnetic circuits.

These closure pieces could be made of 2d stacks of thin sheets of magnetically desirable steels to form the cap and pole protrusion utilizing a 2d manufacturing method.

Other designs, such as polygonal designs with unequal sides that do not fall on the same circle, could allow the creation of shapes of footings for the generator, and stair cases to climb the generator, however the externally accessed slots would become very deep and less convenient.

Figure 1:
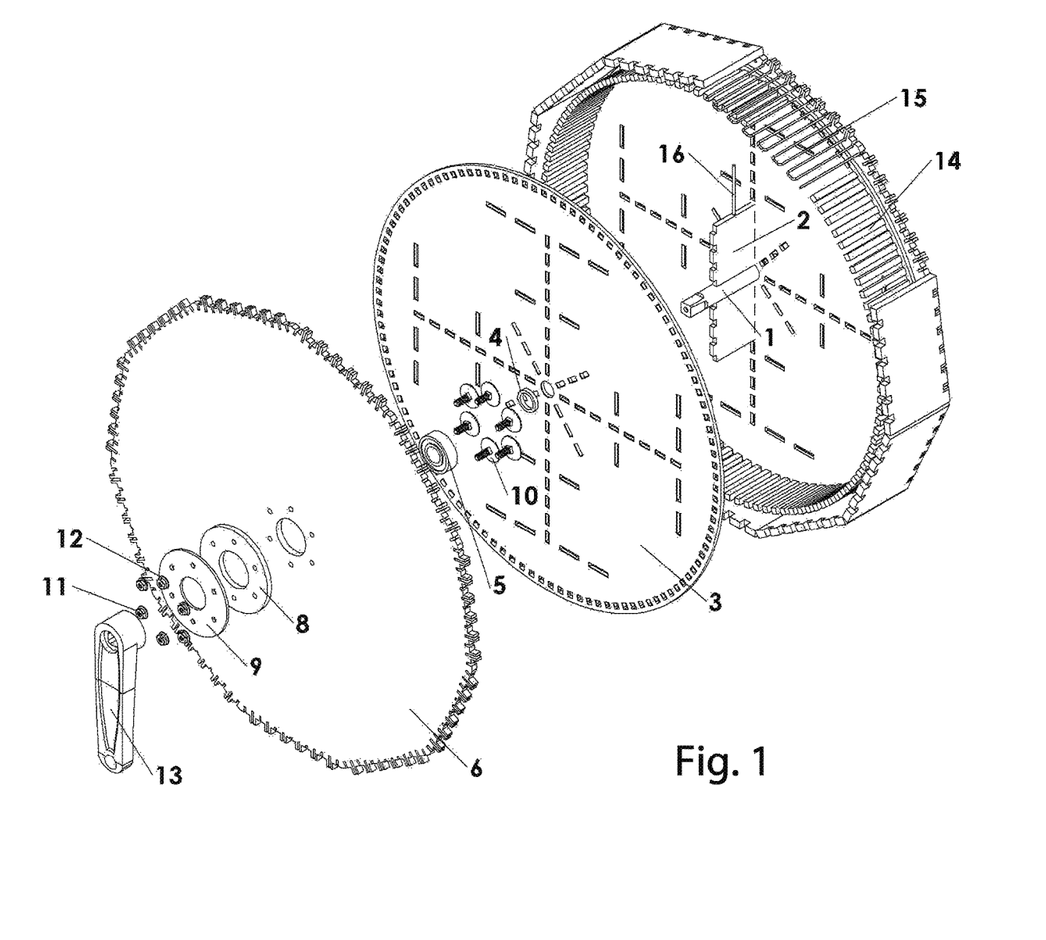
FIG. 1. An exploded view of a generator.

FIG. 1. An exploded view of the generator.

FIG. 1 depicts circular rotor disk 3, one of two, with two examples of castellated spacers (axle torsion spacer or peripheral spacer 2) placed, as many more would be, before the second disk is placed on top and united to form the generator rotor.

Figure 2:
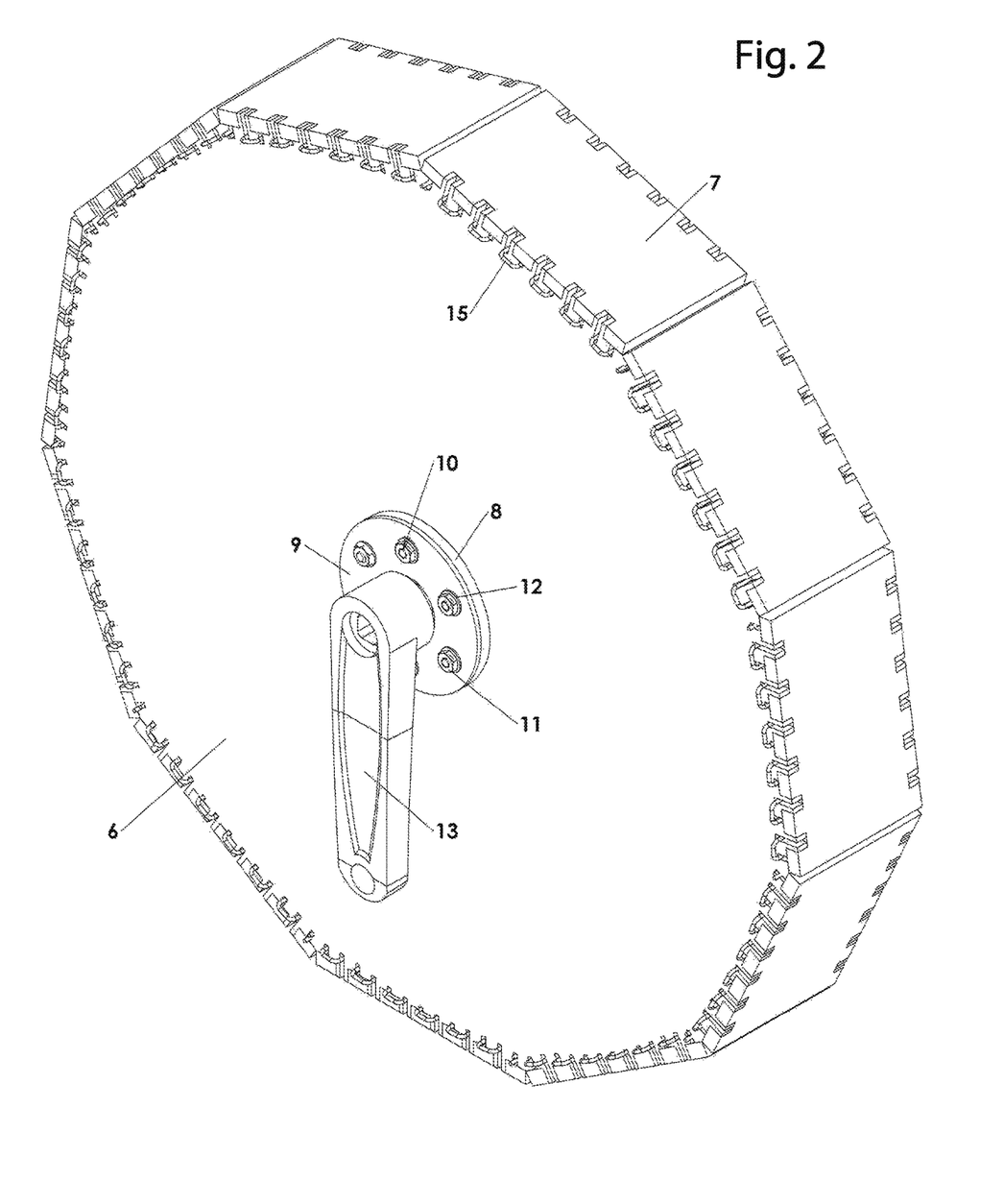
FIG. 2. An outside view of the generator.

FIG. 2. An outside view of the generator.

Figure 3:
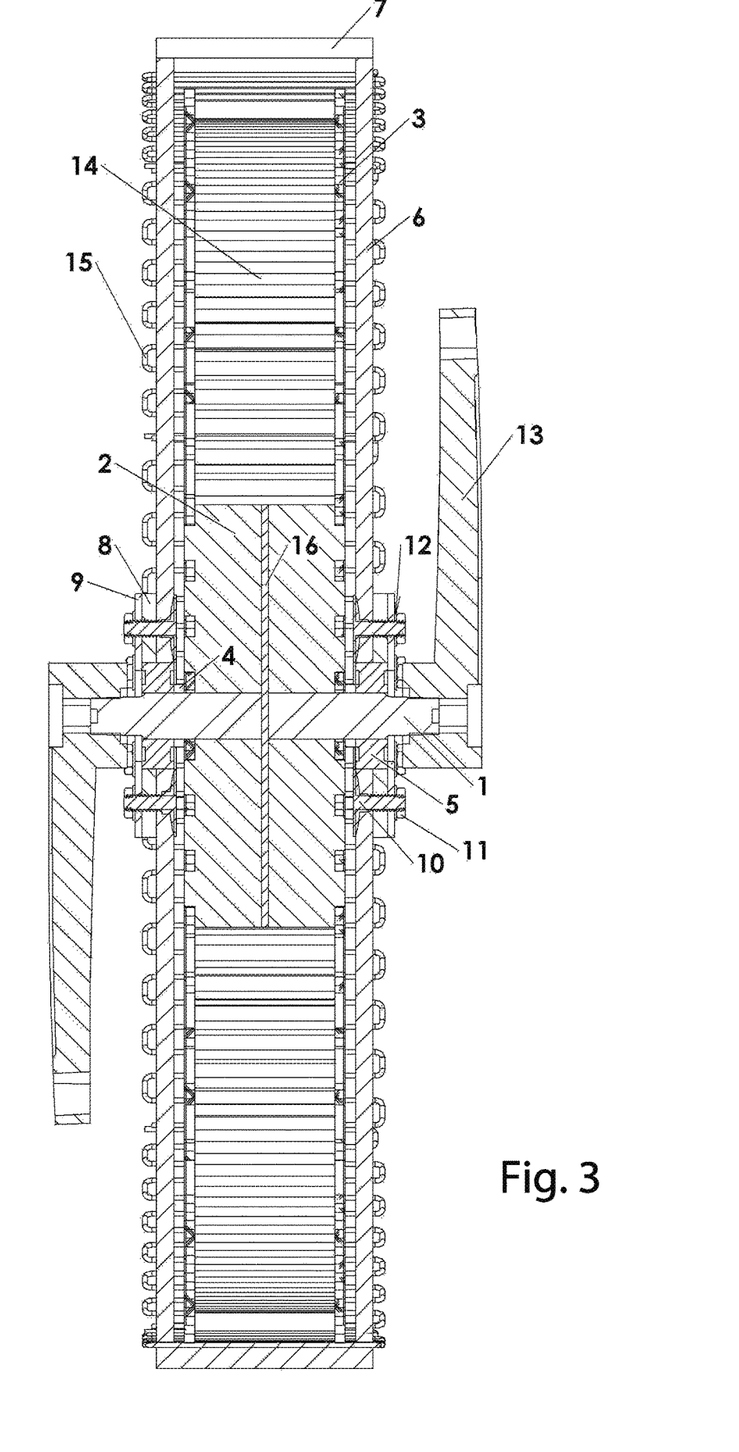
FIG. 3. A sectional view of the generator.

FIG. 3. A sectional view of the generator.

FIG. 3 shows how a metal plate 8 could form a harder bearing seat materiel, such as metal, when combined with a stator side made of a lighter softer materiel, such as wood.

Figure 4:
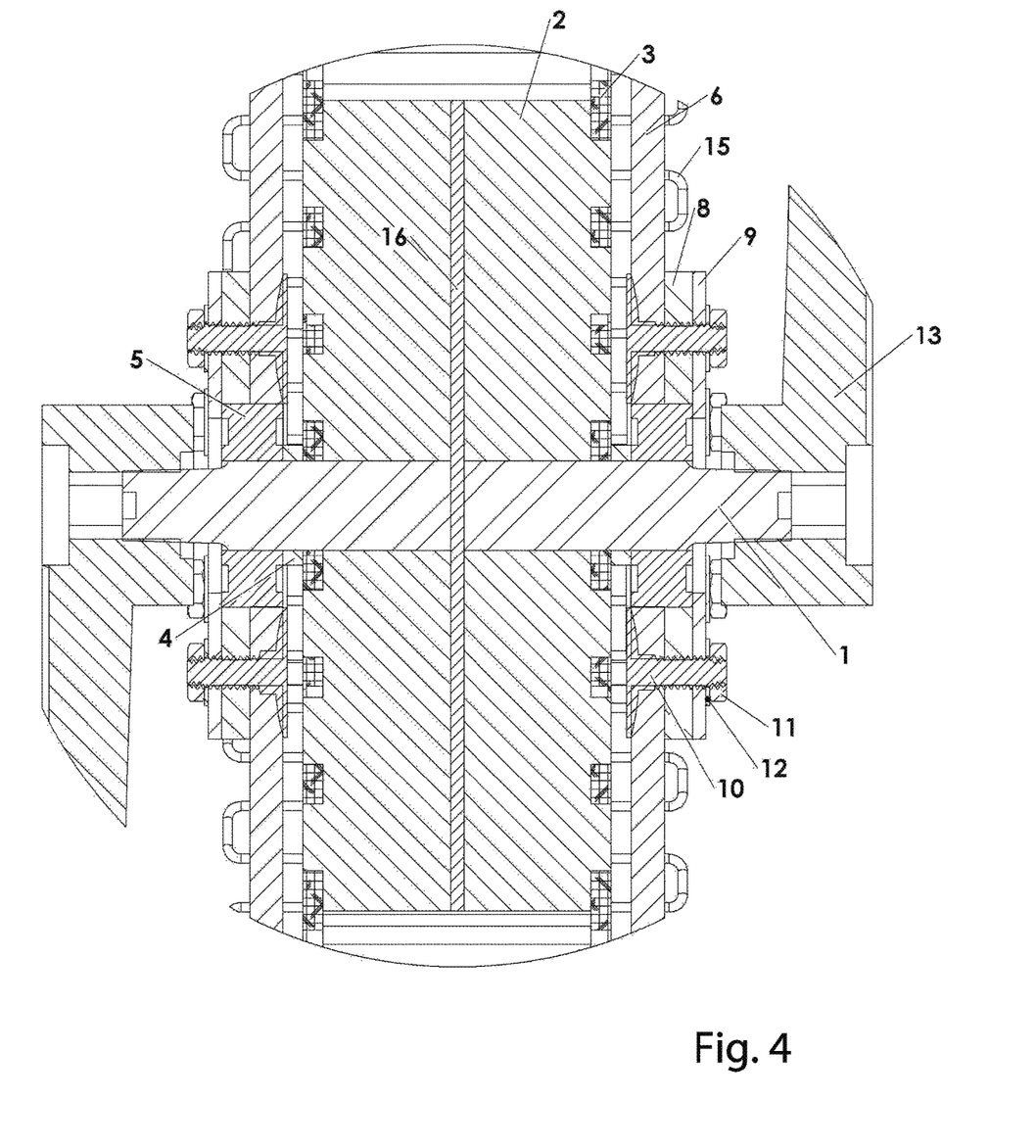
FIG. 4. A detail view of axle 1 of the generator as seen in FIG. 3.

FIG. 4. A detail view of the axle 1 of the generator as seen in FIG. 3.

FIG. 4 is a sectional, two dimensional drawing of the generator. It shows a pin, SPIROL® pin, or glue or other means, connecting to axle torsion spacers 4 through axle 1 or (so called "bracket" in the bicycle industry). FIG. 4 further shows the castellated interconnection with rotor plates 3, as well as bearings 5, that allow pedals 13 to rotate axle 1, and by extension rotor 3, by a SPIROL® pin and castellated spacers 4 which are attached to rotor 3. As depicted in FIG. 4, pedal axle bearing 5 is seated on a double thickness of materiel (8 and 9) around axle 1. Elements 8 and 9 also have holes for bolt (e.g., 10), rivets, or other connection means. It should be appreciated that the total weight of the motor frame might be reduced as it is not required to cut the frame from a materiel that is as thick as bearing seating areas 8 and 9.

Figure 5:
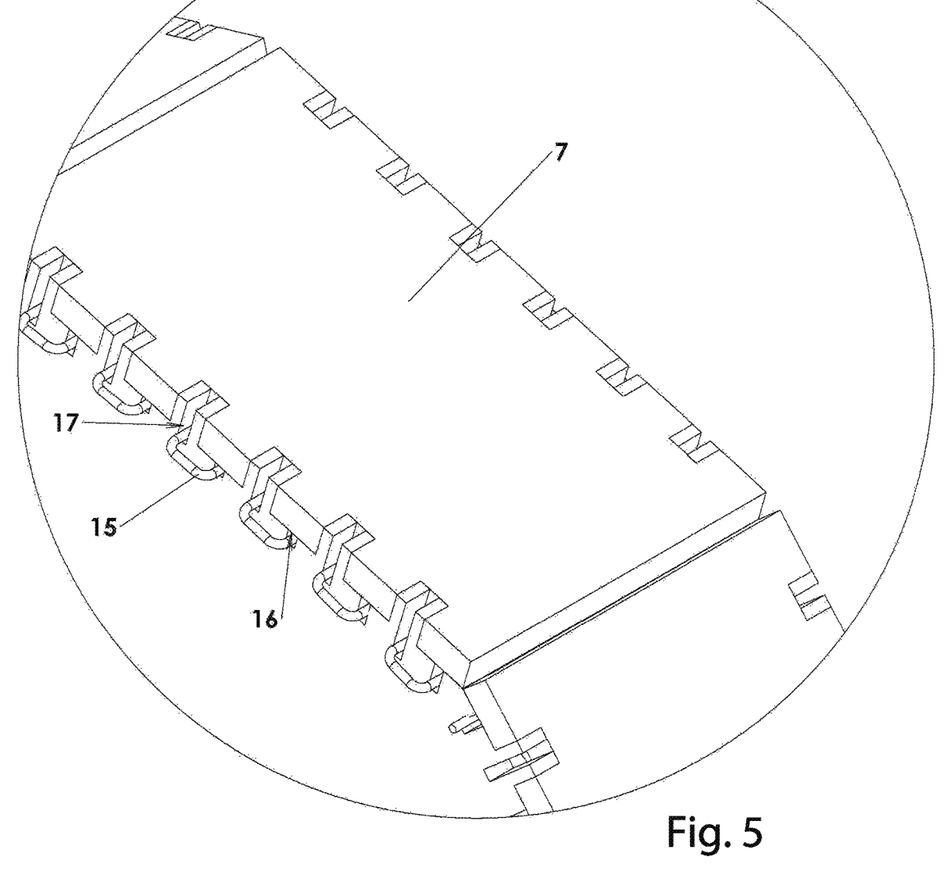
FIG. 5. A detail view of box closure piece 7 of the generator as seen in FIG. 2.

FIG. 5. A detail view of box closure piece 7 of the generator as seen in FIG. 2.

Figure 6:
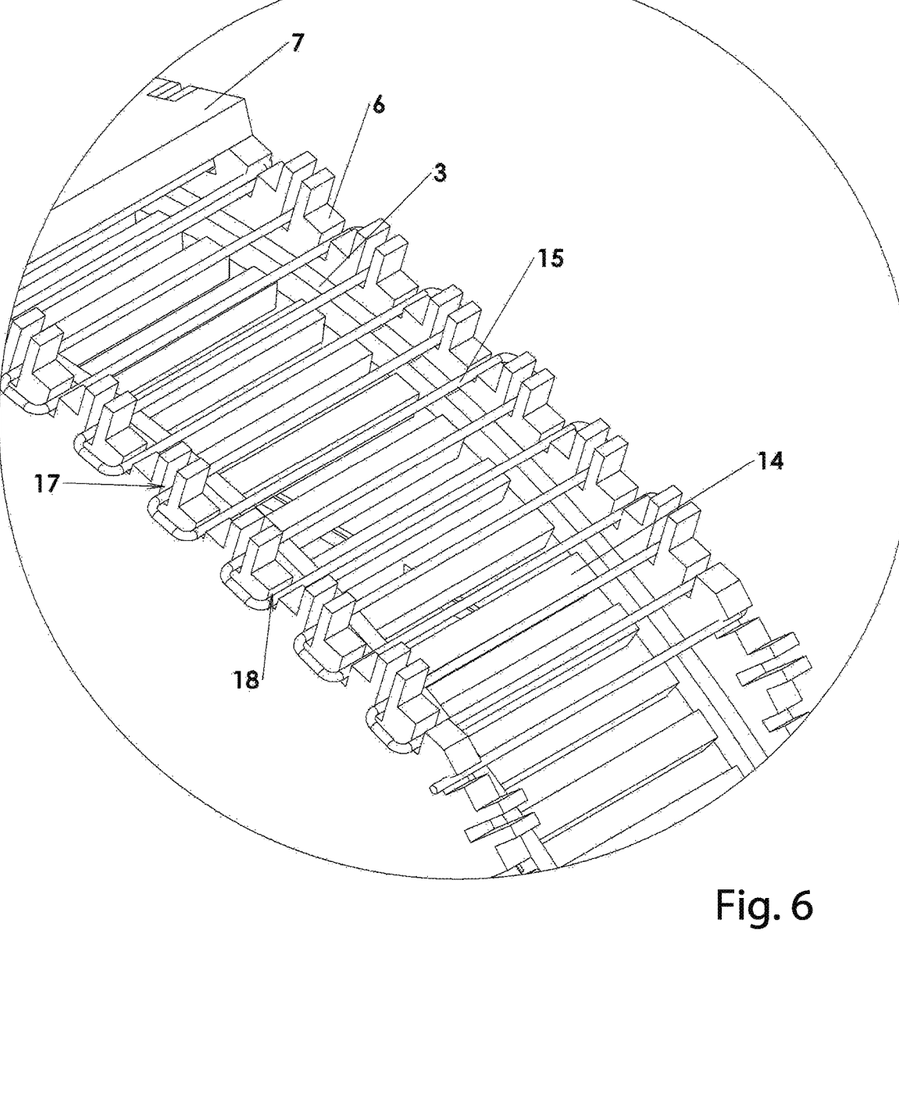
FIG. 6. A close-up view of the edge of the generator without closure piece 7, showing castellations and slots or teeth on stator sidewall 6.

FIG. 6. The edge of the generator, with box closure piece 7 removed. Castellations and slots (17) or teeth on stator sidewall 6 can be seen.

Figure 7:
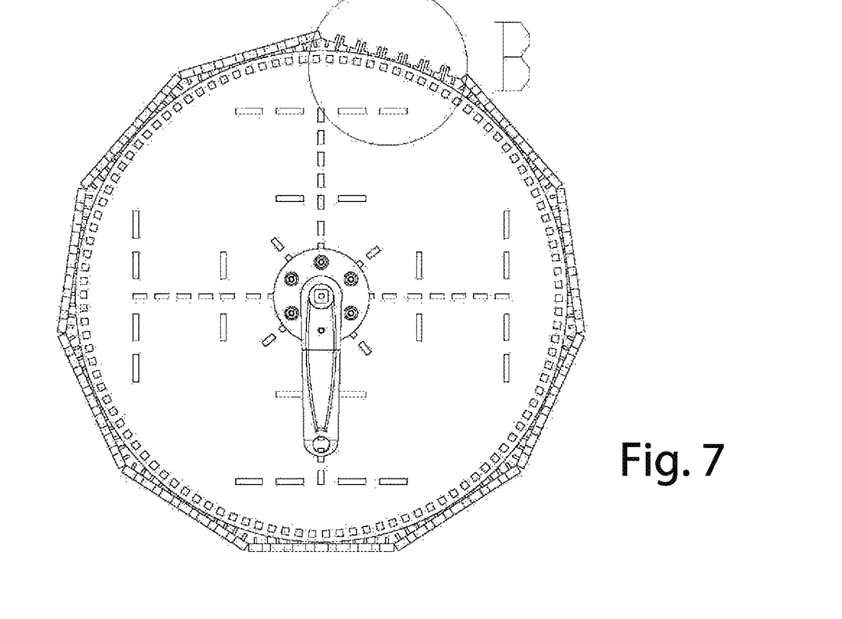
FIG. 7. A side view of the generator with one box closure 7 removed, and a circle B to show the origin of the detail magnification of FIG. 8.

FIG. 7. A side view of the generator with one box closure piece 7 removed at circle B, indicating the origin of the detailed magnification of FIG. 8.

Figure 8:
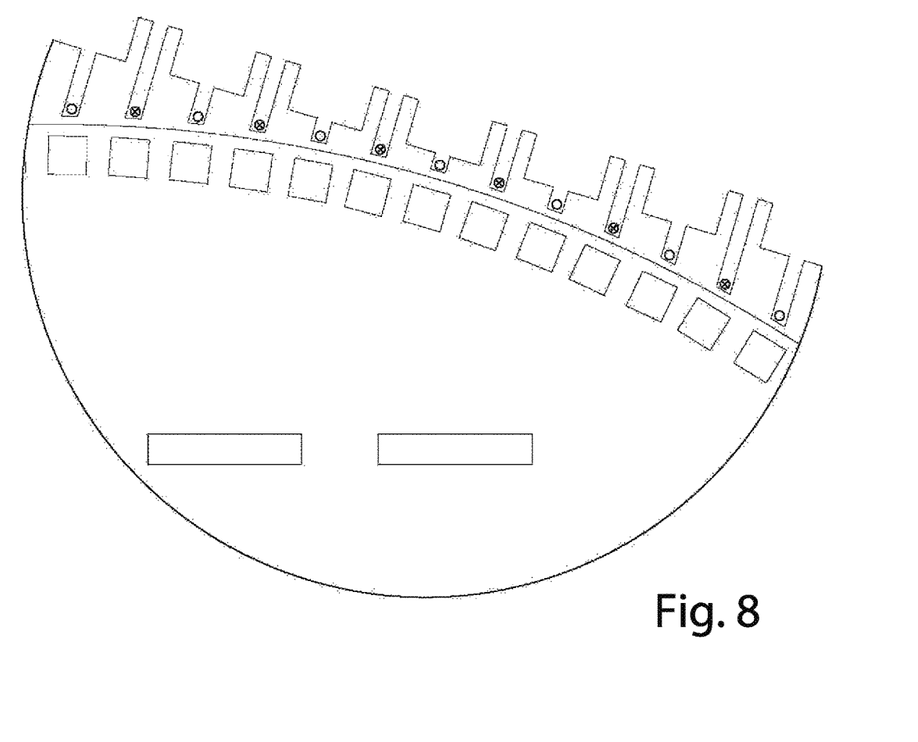
FIG. 8. A detail view of stator sidewall 6, including stator winding wires with cross mark convention, to show alternating electromotive voltage direction in alternate winding slots in opposition to rotor magnets 14 of alternating magnetic polarity.

FIG. 8. A detailed side section view of stator sidewall 6, including stator winding wires. The stator winding wires are depicted with cross-mark convention for alternating electromotive voltage direction in alternate winding slots. The voltage direction of each wire opposes rotor magnets 14, of alternating magnetic polarity, respectively. FIG. 8 shows the castellations of stator sidewall 6 have additional, deeper cut slots (e.g., 17, 18, see FIG. 6) down to very near the operating edge of the moving generator rotor 3. The deeper cuts are placed in locations that allow structural interlocking (see 17). The deeper cuts through the castellation can be used as screw holes for closure (e.g., 7), allowing zig zag conductor stator wiring 15 to be laid in from the exterior of the generator, without the need to thread through a closed hole.

Figure 9:
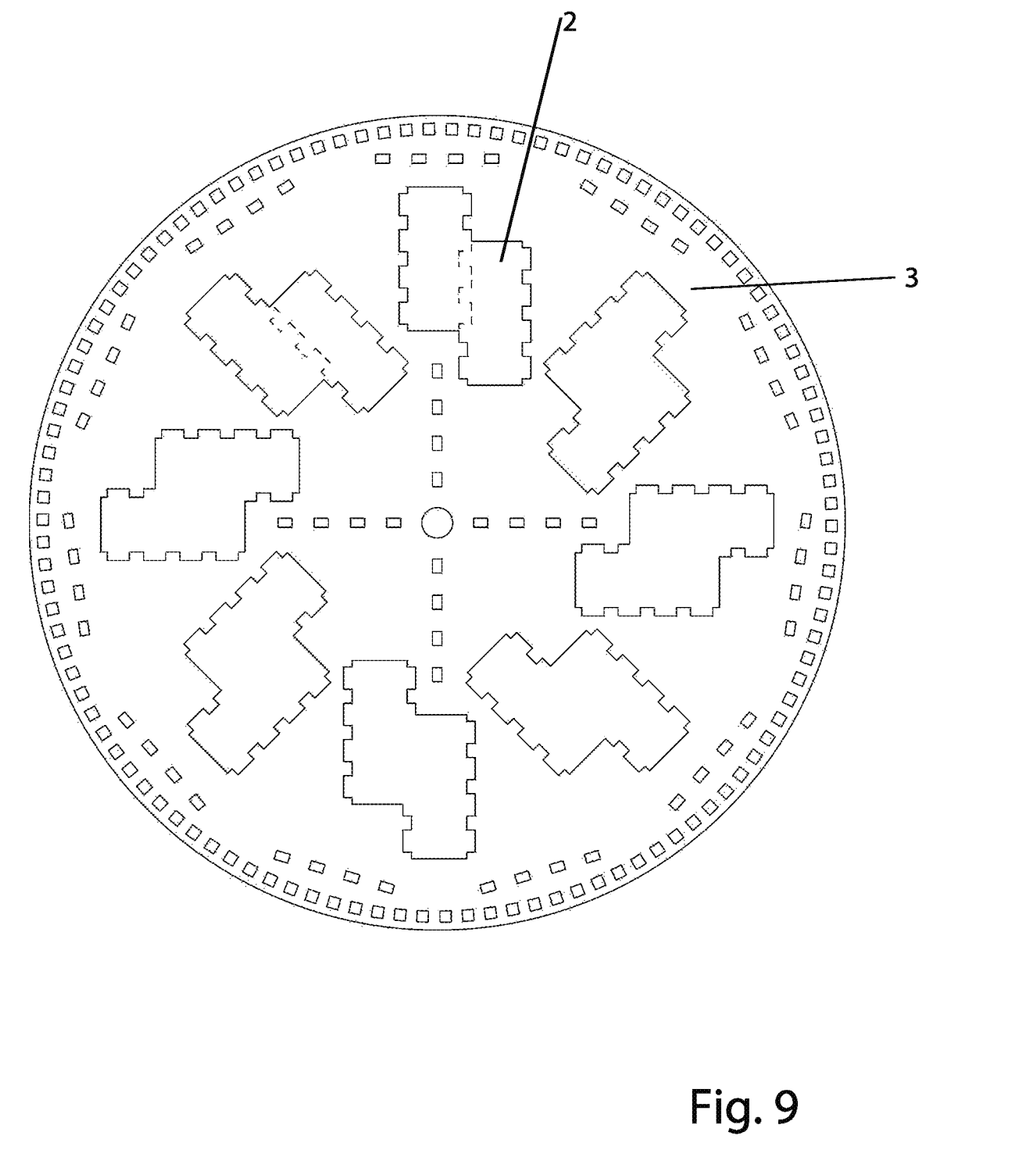
FIG. 9. A view of a rotor cut-out nesting method, where the pieces 2 are also lightening holes in the rotor, and may have a shared cut between two pieces with calculated kerf correction.

FIG. 9. A view of a cut out nesting method for rotor 3. In such embodiments, spacer pieces 2 are cut from the rotor as depicted, functioning as lightening holes in the rotor. Such spacer pieces may have a shared cut between them with calculated kerf correction. For example, two castellated pieces are offset and adjacent (see dashed line on 2 in FIG. 9) so that they share a cutting line to form two sides at once, thus saving time on the cutting machine. The exterior static frame of the machine can be lightened by similar double use of cutouts or 'nesting' as in FIG. 9. Also shown are holes for castellated peripheral rotor spacer plates 2, which could be circular or canted towards 45% from the circular orientation. It is contemplated that such canting provides stiffness and warp resistance to stator sidewall 6, at some cost in air friction (windage) that could be translated into intentional blowing similar to a vacuum cleaner turbine if the application calls for such function.

Figure 10:
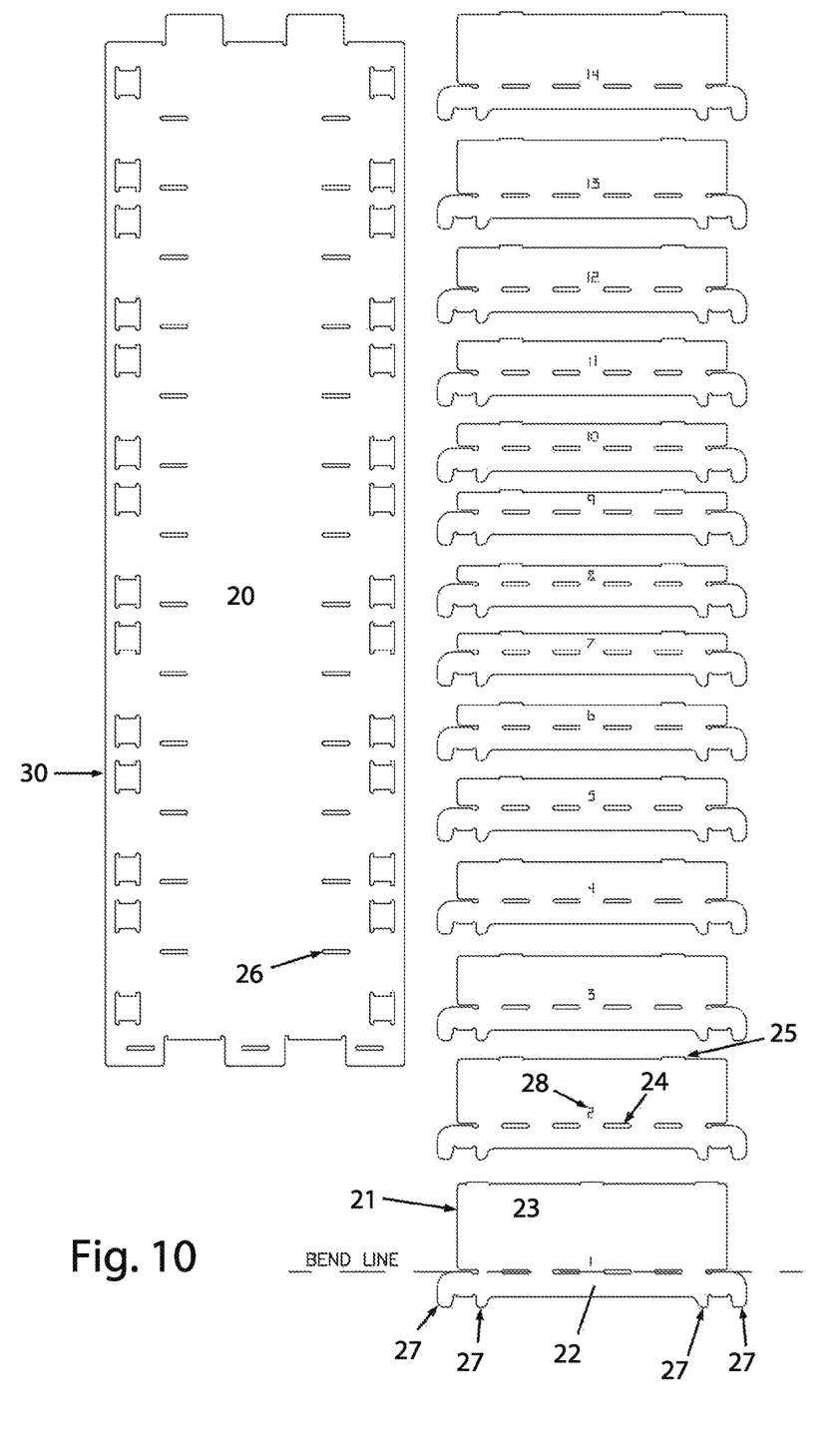
FIG. 10. A view of poles and a magnetically conductive box closure piece.

FIG. 10. Poles and magnetically conductive box closure pieces are further contemplated to improve performance of a magnetic conductive circuit by increasing magnetic continuity. Such closure also accomplishes reduced sound and vibration in the stator body.

A stator magnetic pole and frame circuit is fabricated in 2*d* from flat sheet, magnetically conductive materiel (e.g., steel). The flat pieces of cut, magnetically conductive materiel are shown where the width of the magnetic pole face 22 is equal to the width of the pole-slot cut in the stator, to prevent lever arm teetering of the pole face 22 and magnetic pole riser 23 under the influence of the passing rotor magnetic poles.

In this example, unbent cutout magnet pole face and riser 21, cut with numbers 28, are laid out as they would go into one flat section of the motor frame. Note the magnetic pole risers 23 for each unbent cutout 21 are of different lengths, to accommodate the differing depths of the motor frame wiring slots.

Locator nibs 27 are only on one side of unbent cutout 21, allowing space where a sheet metal bending tool can overhang the length and perform the bending of the part without interference or the necessity of a custom bending tool.

Bend holes 24 form a bend line that functions without an expensive and large tool. Protrusion 25 will pass into one of the slots in cover 26 in magnetic box closure piece 20.

Magnetic box closure piece 20 has overhanging holes 30, positioned to correspond with stator sidewall 6 castellations. Overhanging holes 30 allow magnetic box closure piece 20 to be used on, and stacked with, box closure piece 7, which may be of wood or other materials.

Figure 11:
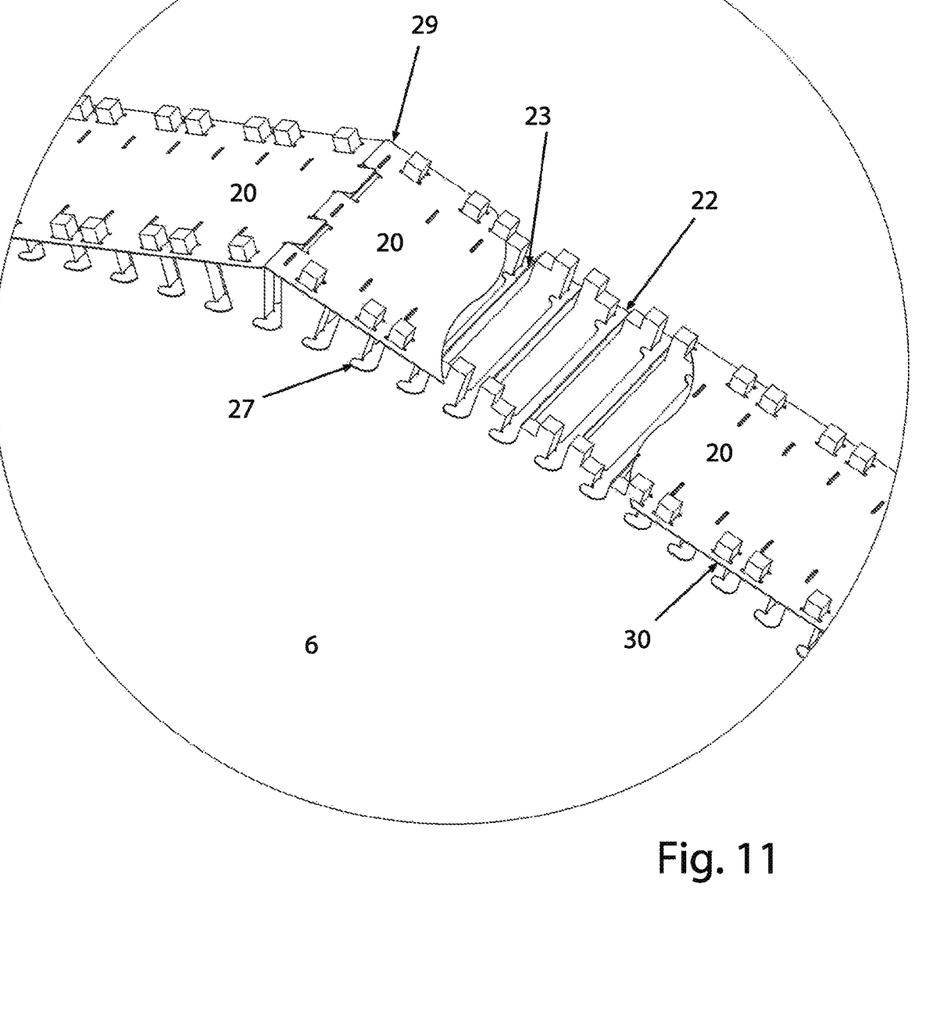
FIG. 11. A view of bent poles and a magnetically conductive box closure piece on a stator.

FIG. 11 shows where and how bent poles (21 bent at indicated bend line in FIG. 10) and magnetically conductive box closure piece 20 interact with stator sidewall 6. Shown are circumferential interlock protrusion 29 on magnetic and non magnetic box closure pieces, which may be stacked on each other. Also, overhanging outside entrapment 30, or hole, of receives stator sidewall 6, allowing box closure piece 7 and magnetic box closure piece 20 to stack.

The design of FIG. 11 supports the wires in a raceway, and prevents the wires from sagging and catching on the rotor magnets. This also avoids having to string wires tightly, as would a piano, and so avoids large tension forces on the structure. This is accomplished by bending unbent cutout magnet pole face and riser 21 to the correct bend radius. This provides a magnetic pole face 22 facing rotor 3 magnetism connected to adjacent stator poles of stator sidewall 6 via magnetic pole riser 23 interlocking with slot in cover 26 of magnetic box closure piece 20. The height of the risers 23 is numbered 28 to accommodate the varying depth of the deeper cut slots of stator sidewall 6.

Figure 12:
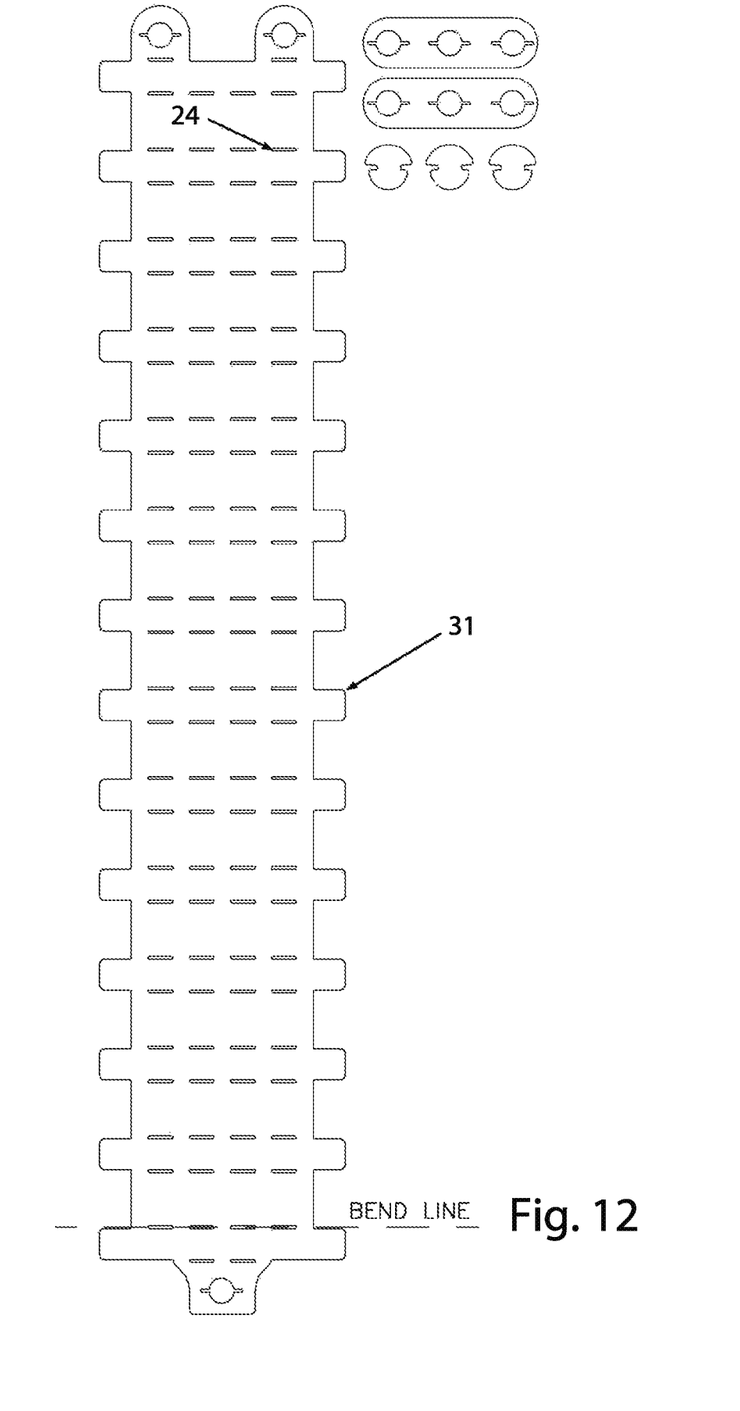
FIG. 12. A view of an under rotor magnet piece, two sided, and an under rotor magnet piece, one sided.

FIG. 12 shows under rotor magnetically conductive pieces 31 connecting rotor adjacent north south magnet circuit sheet magnetic materiel underneath the rotor permanent magnets 14 or electromagnets. There are bending slots 24 which accommodate the curvature of rotor 3.

FIG. 13 is a view of rotor 3 and magnets 14 with installed under rotor magnetically conductive pieces 31 within the machine.

Nothing stated herein precludes or excludes other combinations and arrangements of the methods and mechanisms disclosed herein.

The invention claimed is:

1. An electric device comprising:
   a housing having a first outer wall and a second outer wall;
   an axle spanning between and passing through the first and second outer walls;
   wherein each outer wall has 1) a plurality of stator poles and 2) a plurality of winding slots, at an edge of each outer wall;
   a wire strung between a stator pole of the first outer wall and a stator pole of the second outer wall in a zig-zag pattern;
   a panel spanning between the edge of each outer wall;
   wherein the panel is configured to interlock with the plurality of stator poles at the edge of each outer wall;
   a first rotor plate disposed between the outer walls, the axle passing through the first rotor plate; and
   a magnet disposed at an edge of the first rotor plate proximal to the wire;
   wherein the wire is configured for a first electromotive direction in a first winding slot of the plurality of winding slots; and
   wherein the first electromotive direction is configured to oppose a polarity of the magnet.

2. The device of claim 1, wherein the panel interlocks with at least the first outer wall and second outer wall, and is removably coupled to the plurality of stator poles.

3. The device of claim 1, further comprising a plurality of magnets disposed at an edge of the first rotor plate proximal to the wire.

4. The device of claim 1, wherein the wire is strung about the outside circumference of the plurality of stator poles.

5. The device of claim 1, further comprising a plurality of panels spanning between the edges of each outer wall;
   wherein the plurality of panels are removably coupled with the plurality of stator poles.

6. The device of claim 1, further comprising a second rotor plate coupled to the axle and disposed between the first rotor plate and one of the outer walls.

7. The device of claim 6, wherein the second rotor plate is coupled to the first rotor plate by a spacer plate.

8. The device of claim 7, wherein the first rotor plate has a hole in the shape of the spacer plate.

9. The device of claim 7, wherein the spacer plate is castellated.

10. The device of claim 6, wherein the magnet is coupled to the edge of the first rotor plate and an edge of the second rotor plate.

11. The device of claim 6, further comprising a plurality of magnets coupled to the edge of the first rotor plate and an edge of the second rotor plate proximal to the wire.

12. The device of claim 1, wherein the panel has a castellated edge that interlocks with the plurality of stator poles at the edge of the first outer wall.

\* \* \* \* \*